Oct. 27, 1953     O. W. OERMAN     2,656,775
POWER LIFT
Filed March 30, 1946     3 Sheets-Sheet 1

INVENTOR
OREY W. OERMAN
BY
ATTORNEYS

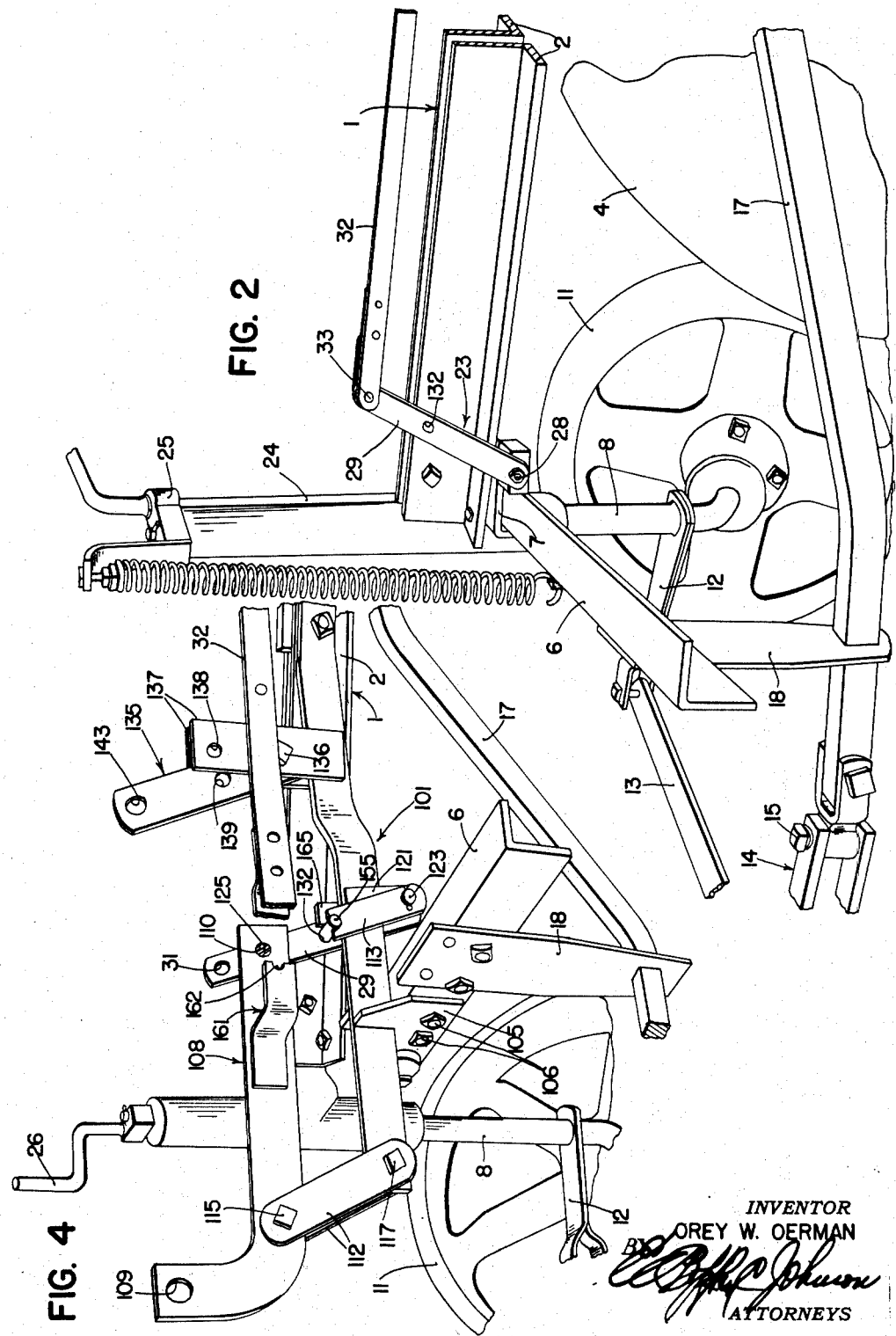

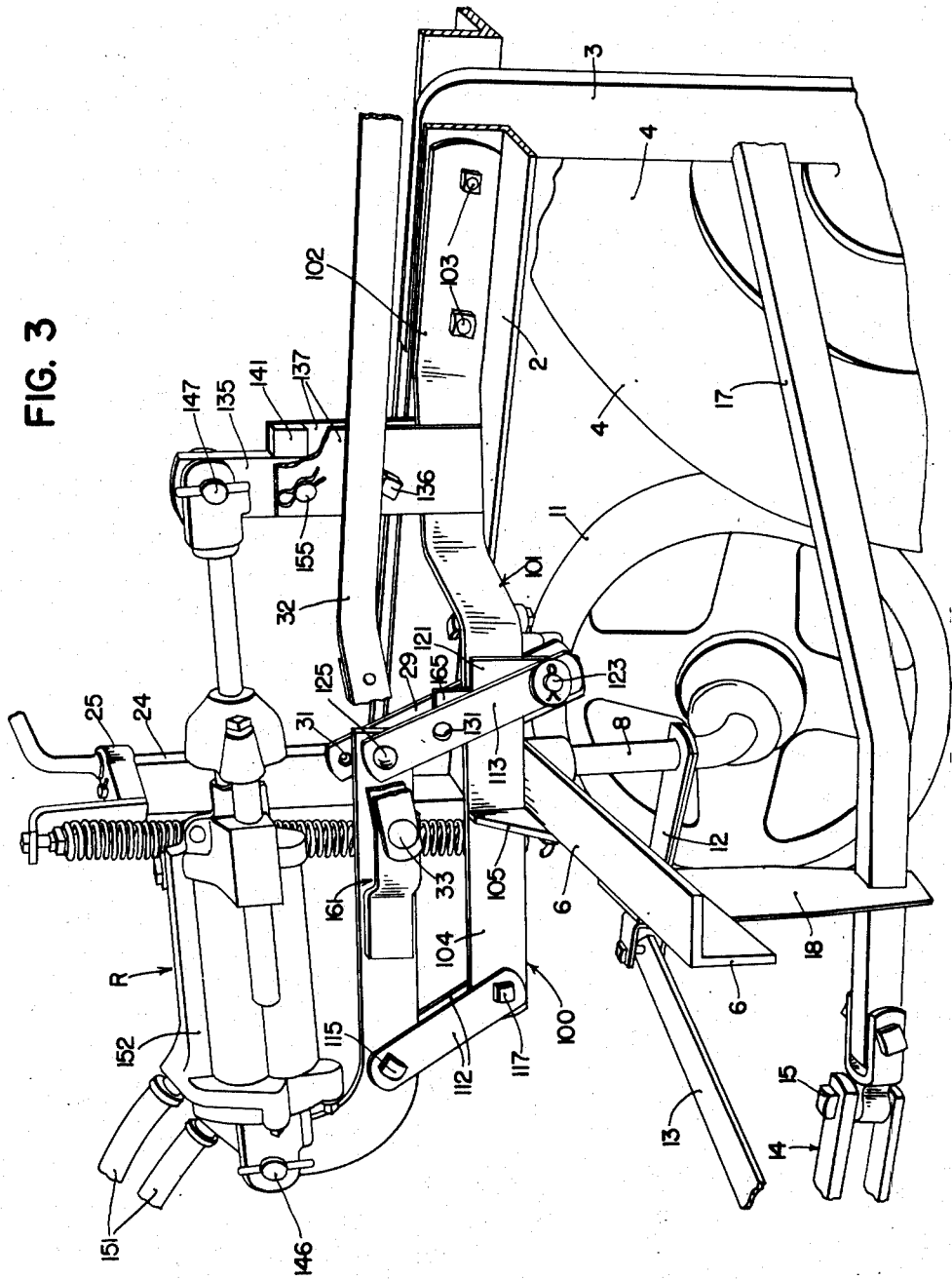

Patented Oct. 27, 1953

2,656,775

UNITED STATES PATENT OFFICE 2,656,775

POWER LIFT

Orey W. Oerman, Moline, Ill., assignor to Deere & Company, Moline, Ill., a corporation of Illinois Application March 30, 1946, Serial No. 658,391

18 Claims. (Cl. 97—46.31)

1

The present invention relates generally to agricultural implements and more particularly to ground working implements and other machines having parts adapted to be raised and lowered, as during operation or for transport or other purposes.

The object and general nature of the present invention is the provision of an agricultural implement having new and improved power operated lift mechanism, especially adapted for use with a hydraulic ram or similar unit, commonly forming a normally permanent part of the tractor to which the implement is hitched. More particularly, it is a feature of this invention to provide a new and improved power lift unit for implements in which excessive lengths of hose lines are avoided.

It is also a feature of this invention to provide a power lift attachment for implements which places the hydraulic ram in a position well forward with respect to the front end of the implement so that, while sharp turns and the like are accommodated, the hose line or lines extending from the tractor to the hydraulic ram need not be of excessive length.

Also, it is a further feature of this invention to provide a power lift attachment for transforming a traction lift implement into a hydraulic ram actuated lift implement. Such an implement, with an attachment of this kind, has the advantage that it may be used behind a tractor not equipped with hydraulically operated ram units, or the implement may be used with such a hydraulically equipped tractor and can make use of the hydraulic equipment thereof.

These and other objects and advantages of the present invention will be apparent to those skilled in the art after a consideration of the following detailed description, taken in conjunction with the accompanying drawings in which one preferred embodiment of the invention has been shown by way of illustration.

In the drawings:

Figure 2 is a perspective view of the front end of the plow shown in Figure 1, before my improved power lift attachment has been installed.

Figure 3 is a view similar to Figure 2 showing in perspective my improved ram mounting.

Figure 4 is a fragmentary view of the front portion of a disk plow incorporating the ram mounting shown in Figure 3, illustrating the parts in the positions they occupy when the ram

Figure 1:
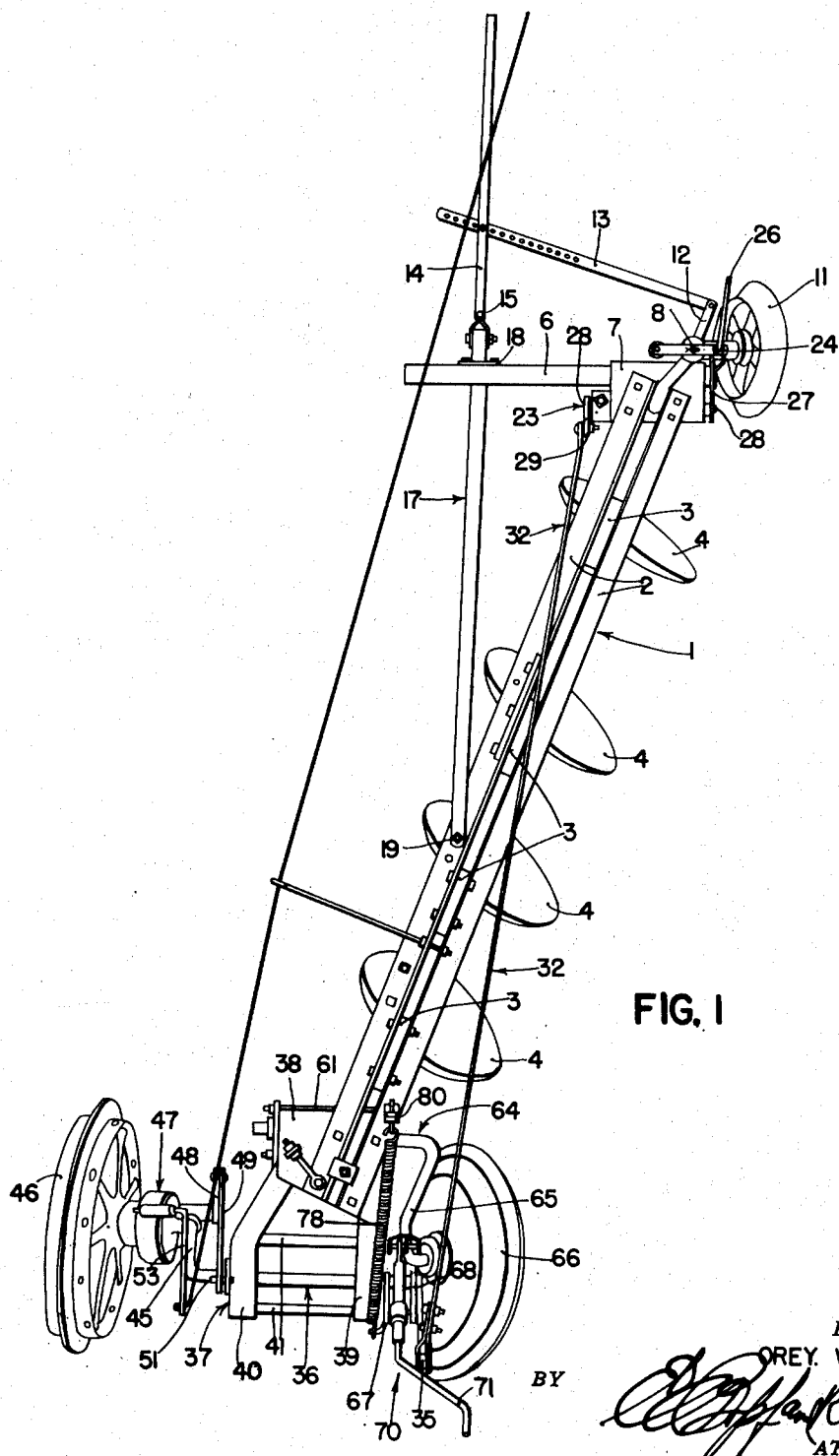
Figure 1 is a plan view showing a disk plow of the type in which the principles of the present invention have been incorporated.

2 has been removed and the plow locked up in a transport position.

Referring now to the drawings, the reference numeral 1 indicates the frame of a disk plow in which the principles of the present invention have been illustrated. The frame 1 includes a pair of angles 2 connected together in back-to-back relation with a plurality of disk standards 3 clamped therebetween, the lower ends of the disk standards having disks 4 rotatable thereon. The frame 1 also includes a laterally outwardly directed frame bar section 6 at the front end of the angles 2 and, in addition, a casting or plate 7 in which the vertical portion 8 of a wheel spindle is shiftable. The lower end of the wheel spindle receive a front furrow wheel 11 and has a forwardly extending arm 12 connected by a link 13 to a hitch bar 14 that is pivotally connected, as at 15, to the front end of a draft bar 17. The latter is supported in a bracket 18 bolted to the laterally outer end of the frame section 6 and at its rear end to the intermediate portion of the main frame 1, as indicated at 19. A bell crank 23 is pivotally mounted on the casting 7 or a part adjacent thereto and is connected by an adjustable link 24 to the upper end of the wheel spindle section 8, whereby rocking movement of the bell crank 23 raises or lowers the front end of the frame 1 relative to the front ground wheel 11. Preferably, the lower end of the adjustable link is threaded and is received in a swivel member carried by the forwardly extending arm 27 of the bell crank 23, and the upper end of the link 24 is rotatably mounted in an extension 25 that is carried at the upper end of the wheel spindle 8. A crank 26 is formed on or carried by the upper end of the adjustable link 24 so as to provide for turning the latter for raising or lowering the frame relative to the front furrow wheel 11. A shaft 28 forms a part of the bell crank 23 and is mounted for rocking movement in the member 7, one end receiving the bell crank arm 27 to which the link 24 is connected while the other end of the shaft 28 receives an upwardly extending arm 29. The bell crank 23 constitutes a shiftable implement part and includes the arm 29 which is pivoted to the implement frame 1 by the shaft 28. The arm 29 is provided with a pair of apertures 31 and 132, and, when the plow is arranged with a traction lift, a longitudinally extending link member 32 is connected at its front end to the arm 29 by a quick detachable connecting pin 33. The link 32, which may be adjustable in length as by being made up of two adjustably connected sections, is connected at its rear end to arm 35 that is secured, as by welding, to the furrowward end of a land wheel axle 36. The latter is swingably connected with the rear end of the frame bars 2 by a rear frame section 37. The latter comprises a plate 38 adjustably bolted to the rear ends of the angles 2 and a pair of angle members 39 and 40. The rear portions of the angles 39 and 40 are connected by cross bars 41. The angles 39 and 40 receive suitable brackets or the like by which the crank axle 36 is swingably connected with the rear frame section 37.

The crank axle 36 includes a forwardly-extending section 45 which carries a land wheel 46 and a land wheel driven self-interrupting clutch unit 47. The latter includes a swingable arm 48 which is connected by a link 49 to a pivot bolt 51 carried by the rear portion of the angle 40. The clutch mechanism 47 is controlled by a trip lever 53, and whenever the latter is actuated the crank arm 48 is rotated by the rotation of the land wheel 46, through approximately a half revolution. Since the upper end of the link 49 is connected to the rear frame section 37, the swinging of the crank arm 48, as just mentioned, causes the crank axle 36 to swing downwardly, relative to the frame of the plow, carrying with it the arm 35 to which the rear end of the link 32 is connected, and the latter is thus shifted forwardly, causing the arm 29 to be swung forwardly. This rocks the shaft 28 and causes the arm 27 to act through the link 24 and the frame member 7 to raise the front end of the frame 1 relative to the front wheel spindle 8. The clutch 47, together with the land wheel 46, crank axle 36 and associated parts, constitutes a traction-operated power lift mechanism which, so far as the present invention is concerned, is largely conventional.

The front ends of the rear frame angles 39 and 40 are connected together by a cross bar 61, and adjacent the latter member are brackets in which a furrow wheel crank axle 64 is swingably mounted. The crank axle 64 includes a rearwardly directed wheel-receiving section 65 which terminates in a spindle part on which a rear furrow wheel 66 is mounted. Fixed to the furrowward end of the crank axle 36 is an arm which comprises a pair of spaced apart arm sections 67 and 68, and an adjustable link member 70, which includes a crank screw 71 for adjusting the effective length of the link 70, is connected between the outer ends of the arm sections 67 and 68 and the rear portion of the crank axle section 65. An assisting spring 78 is anchored at its rear end to a lug fixed on the inside arm 67 and at its forward end is connected to a lug 80 bolted to one of the main frame angles and serves to aid in raising the plow.

It will be noted that the traction lift clutch 47, driven from the land wheel 46, serves as a source of power, when the implement is drawn forwardly, available to rock the rear crank axle 36, and also the front lifting bell crank 23 through the link 32, and thus raise and lower the frame relative to the ground wheels. The lifting bell crank 23 and the rear crank axle 36 therefore constitute front and rear frame lifting means. The front lifting means includes a shiftable part, which is the arm 29, and the rear lifting means includes a rear shiftable part, which is the arm 35. The shiftable parts 29 and 35 are interconnected by the link 32.

In an increasing number of instances, the operator will have available a farm tractor having a hydraulic power lift system, including a remote ram unit connected in a normally permanent fashion by one or more hose lines with a power unit on the tractor. The use of a power unit of this type is preferred over the traction lift type in that the tools may be raised and lowered by power without requiring that the outfit be moving forwardly and also without relying upon the rear land wheel having sufficient traction to operate the clutch and lift the plow. Therefore, those farmers and operators who have a tractor equipped with a hydraulic power unit prefer to control their implements by the ram unit of the power lift system. According to the principles of the present invention, a plow of the type just described may be equipped for hydraulic power operation by the provision of mechanism which is arranged and constructed to supplant the traction-operated power lift mechanism, and a construction to this end will now be described.

Referring now more particularly to Figures 2-4, a ram mounting, indicated in its entirety by the reference numeral 100, is carried at the front of the plow and comprises a support or bracket 101 including a rear section 102 which is bolted, as at 103, to the plow frame 1, the bolts 103 preferably being those which fasten the front disk standard 3 to the angles 2. The bracket 101 also has a landwardly offset section 104 to which a depending apertured lug 105 is welded. Bolts 106 pass through the apertured lug 105 and also through openings in the vertical flange of the outwardly directed frame bar sections 6 at the front of the plow. A ram carrier 108 in the form of an L-shaped bar or link, apertured, as at 109, at its forward end and at its rear end, as at 110, is shiftably mounted on the bracket 101, preferably by front and rear links in the form of swingable arms 112 and 113. The forward link 112 comprises a pair of strap members pivotally connected at their upper ends, as at 115, to the forward portion of the carrier 108, and at their lower ends the straps 112 are pivoted, as at 117, to the forward end of the bracket 101. The latter, rearwardly of the straps 112, carries a downwardly extending apertured lug 121, and the rear link 113 is swingably mounted on a pin 123 that is carried by the lug 121. The upper end of the link 113 is apertured to receive a pin or bolt 125 which connects the link 113 with the rear end of the carrier member 108. The bracket 101 and associated parts are so constructed and arranged that when the bracket 101 is mounted in position, the link 113 lies closely adjacent the implement lift arm 29, with the pin 123 coinciding with the axis of rocking movement of the bell crank shaft 28. The link 113 is apertured, as at 131, and the opening 131 lies, as shown in Figure 4, in axial alignment with the corresponding opening 132 formed in the arm 29. The ram carrier bar 108 constitutes a front ram-receiving member or part, for receiving one end of the ram R. The other or rear end of the ram R is connected to the implement frame through a ram anchor which includes a rear ram-receiving member carried by the bracket 101. Preferably, the ram-receiving member is in the form of a swingable part 135 pivoted, as at 136, to a pair of upstanding bracket arms 137. The latter are apertured, as at 138, and similarly the swingable member 135 is apertured, as at 139, these apertures being adapted to be brought into alignment when the swingable part 135 is swung rearwardly against a block 141 which is welded in position between the two bracket parts 137. The outer end of the swingable part 135 is provided with an aperture 143.

When the power operated ram unit, indicated by reference character R in Figure 3, is mounted in operative position, the forward end of the ram R is connected with the carrier 108 by means of a quick detachable pin 146. The rear or piston end of the ram unit R is connected by a similar quick detachable pin 147 with the swingable arm 135, the pin 147 being inserted in the opening 143. The pin 146 is inserted through the opening 109 in the front end of the carrier bar 108. A pair of hose lines 151 are connected to the cylinder section 152 of the unit R and provide for the delivery of fluid under pressure to one end of the cylinder 152 and withdrawal of fluid from the other end, optionally. The particular details of the hydraulic unit R do not per se form a part of the present invention and hence need not be further described. By virtue of the quick detachable pins 146 and 147 the ram arm may be attached or removed as desired. As mentioned above, when the unit R is attached the quick detachable pin 147 is inserted in the opening 143 in the upper end of the arm 135. The latter is then locked to the bracket 101 by a quick detachable locking pin 155, which is inserted through the openings 138 and 139 in the parts 135 and 137.

A lug 161 is fixed to the side of the carrier bar 108 and is apertured, as at 162, the aperture 162 being placed slightly ahead of the aperture 110, it being remembered that the aperture 110 is in axial registry with the aperture in the outer end of the arm 29 receiving the pin 33 when the link 32 is directly connected to the implement lift arm 29 as shown in Figure 2. When the arm ram R is installed, the pin 33 is removed from the arm 29 and the front end of the link 32 connected by the pin 33 to the aperture 162 in the lug 161.

As shown in Figure 3, the ram unit R may be operated by power in either direction, and when the unit R is extended, the ram carrier 108 is swung forwardly, the link 113 serving as a part movable with the carrier into a given position, relative to the implement frame, determined by the maximum stroke of the ram unit R. This exerts a pull on the link 32 and also swings the implement lift arm 29 forwardly, thus raising both ends of the frame 1 relative to the front and rear furrow wheels 11 and 66. During this raising action, the swingable part 135 rests against the stop abutment 141, but the locking pin 155 may be removed freely when necessary. For example, if it should be desired to remove the ram unit and leave the tools in an elevated position, the ram unit is extended the full amount, and then the pin 155 is removed from the openings 138, 139 and inserted through the openings 131 and 132 in the arms 113 and 29. At this point the bracket 101 carries an abutment 165 placed immediately behind the pin 155 when the parts are in the position shown in Figure 4. With the pin 155 in the openings 131 and 132 and in front of the lug or abutment, the pressure in the unit R may be relaxed. This permits the linkage to move the locking pin 155 back against the abutment 165, which then takes the load and holds the tools in an elevated position. The abutment 165, which receives the locking pin 155 in abutting relation, therefore constitutes a lock-receiving section. After the pin 155 is brought up against the section 165 the latter sustains the weight of the frame and associated parts, and it is then a simple matter to disconnect the ram unit R merely by pulling out the quick detachable pins 146 and 147. In this way, the pin 155 and associated parts constitute means adapted to lock the link 113 to the implement frame when the link is in the position to which it is moved by the maximum extension of the ram unit R.

It will be noted particularly from Figure 3 that the ram unit R is so placed that it lies well forward of the front end of the plow. This arrangement has the advantage that relatively short hose lines 151 may be employed. These hose lines are fairly expensive items, and hence it is a very important advantage to have the hose lines as short as possible. Further, by anchoring the piston end of the ram unit to the fixed bracket on the support 101, and by utilizing the forward extension of the cylinder section 152 relative to the piston, a greater amount of lifting power is available than would be the case if the ram unit R were reversed. The carrier 108 and associated parts provide a swingable support receiving the cylinder end of the ram unit R and provide for attachment of the piston end of the unit R with the fixed point on the implement frame. It is also important to note, particularly from Figure 3, that when the ram unit is employed as a power unit for raising the implement frame, the link 32 acts in tension. The pivot 33 (Figure 3) lies slightly ahead of the outer opening in the arm 29, in which the link 32 is connected when the plow traction clutch is used, and this forward disposition of the lug 161 is made for the purpose of taking up any slack in the parts in passing from the operation in which the rear or traction lift clutch acts through the link 32 in compression to raise the front end into the operation where the power lift is at the front end of the implement and acts in tension through the link 32 to raise the rear end of the frame.

It is a relatively simple matter, further, to equip plows already in the field as traction lift plows with a power lift unit. All that it is necessary to do is to mount the support 101 and associated parts on the plow frame, disconnect the front end of the link 32 from the arm 29 and connect it to the lug 161 on the ram carrier. Then by mounting the ram R in place, the plow is converted from a traction lift to a hydraulic power lift.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A detachable ram mounting adapted for use with an agricultural implement having a frame, a ground wheel shiftable relative thereto, and means including a swingable arm connected to shift said frame relative to said ground wheel, said ram mounting comprising a support adapted to be connected with said implement adjacent said swingable arm, a ram-receiving part, means for shiftably mounting said part on said support, means for mounting said support on said frame in a position so that a portion of said ram-receiving part is disposed alongside said swingable arm, means connecting said portion of the ram-receiving part with the swingable end of said arm, and a second ram-receiving member carried by said support in spaced relation with respect to said first mentioned ram-receiving member.

2. A ram mounting for an agricultural implement having a frame, a ground wheel shiftable relative thereto, and means including a swingable arm connected to shift said frame relative to said ground wheel, said ram mounting comprising a support adapted to be connected with said implement, a pair of swingably mounted links carried by said support, one in a position alongside said swingable arm, a ram carrier, pivot means for mounting said ram carrier on said swingable links, means connecting said one link with said swingable arm so as to cause said one link and arm to swing together, means carried by said support and adapted to receive one end of said ram, said means being spaced from said ram carrier so as to receive and support said ram for operation therebetween.

3. A power lift attachment for agricultural implements having a shiftable member connected with a part to be shifted, said attachment comprising a support adapted to be connected with the implement adjacent said shiftable member, a ram-receiving part movably mounted on said support, means engageable with said ram-receiving part and said shiftable member for connecting said ram-receiving part with said shiftable member, a second ram-receiving part fixed to said support, a ram adapted to be mounted on said ram-receiving parts, detachable means for releasably mounting said ram on said ram-receiving parts, an abutment on said support adjacent said shiftable member, and a part connectible with said shiftable member in a position to engage said abutment when said ram is disconnected from said ram-receiving parts.

4. A ram mounting for an agricultural implement or the like having a shiftable part and adapted to be connected with a tractor having a hydraulic ram for operating said shiftable part, said ram mounting comprising a bracket attachable to said implement, a member shiftable on said bracket and adapted to be operatively connected with said implement shiftable part, a member fixed to said bracket, means for detachably connecting one end of said ram to one of said members, means for detachably connecting the other end of said ram to the other of said members, one of said connecting means including a part swingable relative to the associated member and receiving the associated end of said ram, stop means acting between said swingable part and the associated member for limiting relative movement therebetween, whereby said ram may be operated so as to act against said stop and shift said implement shiftable part in one direction, said swingable connecting part and the associated member having apertures adapted to be brought into registry when said stop means limits said relative movement, a locking part insertable in said registering openings whereby said ram may then be operated to move said implement shiftable part in the other direction, abutment means on the bracket, a member connected with said implement shiftable part and shiftable into a locking position relative to said abutment when said ram is operated to shift said implement part substantially its full extent in said one direction, and means for locking said last mentioned member against said abutment to provide for holding said implement shiftable part in the position to which it is moved by said last mentioned operation of said ram.

5. A ram mounting for an implement of the type that is adapted to be detachably connected with a tractor having a source of power and which includes a part adapted to be shifted from one position to another and an operating member for shifting said implement part, said ram mounting comprising a bracket adapted to be detachably connected with said implement, a ram carrier including a part shiftable relative to the bracket and alongside said operating member, ram-receiving means on said carrier and adapted to receive one end of the ram, a member fixed to said bracket, a member swingably carried by said bracket and adapted to receive the other end of the ram, an abutment on said bracket disposed adjacent said shiftable ram carrier part and said operating member in one position of said member and part, the latter member and part having a pair of registering openings adjacent said abutment, said swingable member and said fixed member also having a pair of registering openings, and a locking part insertable in either pair of openings for receiving said locking part in either of two positions, one fixing said bracket-carried swingable member to the cooperating fixed member and the other position connecting said shiftable ram carrier part and the implement operating member, said locking part, when in said other position, cooperating with said abutment for holding the implement part in one of its positions.

6. The combination with an agricultural implement having a frame and a part adapted to be shifted relative to the frame and including an arm pivoted to said frame, of a bracket attached to said implement, an arm swingably connected with said bracket in a position so as to lie adjacent said first mentioned arm, a hydraulic ram, means connecting said ram at one end with said swingable arm for swinging the same, means connecting said swingable arm to said pivoted arm so as to cause said arms to move together, and means connecting the other end of said ram with said bracket, whereby extension or retraction of said ram, acting through said swingable arm and said pivoted arm, serves to shift said shiftable implement part.

7. The combination with an agricultural implement having front and rear parts to be shifted, shifting means comprising traction operated power lift mechanism at the rear of the implement to shift the rear part, and a connection detachably associated with said front part and extending from the latter to said rear part so as to cause both of said front and rear parts to be shifted by operation of said shifting means, of a power operated mechanism adapted to be used in place of said shifting means, said mechanism comprising a support attached to the implement adjacent the front thereof, a power operated member movably mounted on said support and connected with said front part in lieu of said detachable connection, and means on said movable member receiving said detachable connection, whereby movement of said member serves to operate both of said front and rear parts.

8. The combination with an agricultural implement including a frame, front and rear lifting means, each including a shiftable part, a link connecting said parts, said link being detachable from one of said parts, and means at the rear of the implement and associated with the other of said parts and acting through said link in compression for actuating said one part, so as to operate both of said parts simultaneously, of an auxiliary operating unit comprising a support adapted to be connected to the forward part of the implement frame, a ram-receiving member carried by said support, a second ram-receiving member, means for connecting said second ram-receiving member with said support for generally fore-and-aft movement relative thereto, means for connecting said second ram-receiving member with said one part when said link is detached therefrom, and means on said second ram-receiving member for receiving the adjacent end of said link when the latter is detached from said one implement raising part and said second ram-receiving member connected therewith, said link-receiving means being spaced a distance from the point where said ram-receiving member is connected with said one implement-raising part.

9. A ram mounting for an agricultural implement having lifting means including a pivoted arm, said ram mounting comprising a bracket attachable to the implement, means for mounting the bracket on said implement in a position such that one portion of the bracket lies alongside said pivoted arm, a second arm pivotally connected with said portion of the bracket, the pivot axis of said second arm substantially coinciding with the pivot axis of the arm of said lifting means, a ram-receiving member connected with said second arm, means on said member to receive one end of said ram, means on said bracket to receive the other end of said ram, and a connection between said arms to cause them to swing together when said ram is operated.

10. A ram mounting for an implement of the type that is adapted to be connected with a tractor having a hydraulic ram for raising the frame of the implement, said ram mounting comprising a first member shiftable by extension of the ram in one direction, means connected with said member and adapted to detachably receive one end of said ram, an abutment, means for supporting said abutment on said frame adjacent said member in the position of the latter when the implement frame is raised, a ram anchor adapted to receive the other end of said ram and comprising a relatively stationary part and a second part shiftable relative to said stationary part and adapted to releasably receive the other end of said ram, means for connecting said relatively stationary part with said frame, means for limiting the movement of said second part relative to said stationary part in a direction to transmit the reaction of said ram through said stationary part and the connecting means therefor to said frame when raising the latter, and a locking part connectible with said first member in a position, when the frame is raised, adjacent but in front of said abutment, said locking part being engageable with said abutment, upon a retraction of said ram from its extended position, so as to act against said abutment to hold the frame in an elevated position independently of said ram, whereby further retraction of the latter relieves the pressure of said second part of said ram anchor against said relatively stationary part and thus facilitates the disconnection of said ram from said second part and said shiftable member.

11. A ram mounting for an implement of the type that is adapted to be connected with a tractor having a hydraulic ram for operating a shiftable part on the implement, said ram mounting comprising an abutment stationarily associated with the implement, a member swingable toward and away from said abutment and having a swinging end portion and a lock-pin-receiving opening, means for connecting said swingable member with said implement part, means connected with the swinging end portion of said swingable member for releasably receiving one end of said ram, means for releasably receiving the other end of said ram, means for connecting said last mentioned ram-receiving means with the implement, and a lock pin disposable in said opening in said swingable member and engageable with said abutment for holding said swingable member and implement part against movement in one direction relative to said implement.

12. A ram mounting for an implement of the types that is adapted to be connected with a tractor having a hydraulic ram for raising the frame of the implement, said ram mounting comprising a first member shiftable by extension of the ram in one direction to raise said frame, means connected with said member and adapted to detachably receive one end of said ram, means for locking said first member so as to hold said frame in a raised position, and a ram anchor adapted to receive the other end of said ram and comprising a relatively stationary part and a second part shiftable relative to said stationary part and adapted to releasably receive said other end of said ram, means for rigidly connecting said relatively stationary part with said implement frame, said first member being shiftable with respect to said relatively stationary part and the implement frame by extension of said ram, means for limiting the movement of said second part relative to said stationary part in a direction to transmit the reaction of said ram through said stationary part to said frame when raising the latter, said second part being freely swingable away from said limit means so as to facilitate disconnecting said ram after said locking means is in a position holding said frame in a raised position.

13. A ram mounting for an implement of the type that has a frame and a part adapted to be shifted relative to the frame from one position to another and is adapted to be connected with a tractor having a double acting hydraulic ram for shifting said implement part, said ram mounting comprising a first ram-receiving member, means for connecting said first member with said implement part for shifting the latter in one direction by operation of said ram in said one direction, means for holding said implement part in one position and including apertured and lock-receiving sections, one connected with said implement part, means for mounting the other of said sections on said frame, said sections being adapted to be brought into registry by operation of the ram through its full extent of movement in said one direction, locking means insertable in the apertured section and engaging said lock-receiving section, a ram anchor adapted to receive the other end of said ram and comprising a relatively stationary part and a second part shiftable relative to said stationary part and adapted to releasably receive said other end of said ram, means for connecting said stationary part with said frame, means on the stationary part for limiting the movement of said second part relative to said stationary part in a direction to sustain the reaction of said ram when moving said shiftable implement part in said one direction to said one position, and a locking part connectible with said relatively stationary part and said second part for locking them against movement, one relative to the other in the other direction so as to take the reaction of said ram, when said insertable locking means is removed from said apertured and lock-receiving sections, when shifting said implement part in the other direction.

14. A ram mounting for an implement of the type that has a frame and a part adapted to be shifted relative to the frame from one position to another and is adapted to be connected with a tractor having a hydraulic ram for shifting said implement part, said ram mounting comprising a first member, means on said first member to detachably receive one end of said ram, a connection between said first member and said implement part for shifting the latter in one direction when said ram is operated in said one direction, means adapted to be connected between said frame and said implement part for holding the latter in one position and including apertured and lock-receiving sections brought into registry by operation of the ram through its full extent of movement in said one direction, and locking means insertable in the apertured section and engaging said lock-receiving sections, a ram anchoring member adapted to detachably receive the other end of said ram, means for pivotally connecting said ram anchoring member with said frame, stop means for limiting the movement of said anchoring member relative to the frame in one direction, said stop means taking the reaction of said ram when the latter is operated to shift said implement part into said one position, and means connectible with the implement frame and engageable with said ram anchoring member for releasably locking said ram anchoring member against movement in the other direction, whereby said ram will react through said releasable locking means against said frame to shift said implement part in the other direction.

15. A ram mounting for an implement of the type that has a frame and a part adapted to be shifted relative to the frame from one position to another and is adapted to be connected with a tractor having a hydraulic ram for shifting said implement part, said ram mounting comprising a first member, means connected with said first member to detachably receive one end of said ram, a connection between said first member and said implement part for shifting the latter in one direction by operation of said ram in said one direction, said first member having a pin-receiving opening, pin-receiving means, means for mounting said pin-receiving means on said frame so as to be positioned adjacent said pin-receiving opening in said first member when the implement part has been shifted its full extent in said one direction, a locking pin insertable in said opening in a position to engage said pin-receiving means and to react thereagainst to lock said implement part in said fully extended position, a ram anchor adapted to receive the other end of said ram and comprising a part, means for pivotally connecting said part with said frame, stop means limiting the movement of said last mentioned part in a direction to receive the reaction of said ram when shifting said implement part into said fully extended position, and means for supporting said stop means on said frame, and releasable locking means engageable with said ram anchor part for locking the latter against movement in the other direction relative to said stop means, so as to receive the reaction of said ram when shifting said implement part by power away from its fully extended position.

16. For use in an agricultural implement having frame means, a part shiftably connected therewith, and a ram unit for shifting said part: a ram mounting comprising a generally fore-and-aft extending member connected at its rear end with said implement part for operating the latter, means for supporting said fore-and-aft extending member on said frame means, including means providing a swinging link mounting for said fore-and-aft extending member, a first ram-connecting means for receiving the rear end of said ram, means for carrying said ram-connecting means on said frame means, a second ram-connecting means for connecting the front end of said ram with the front portion of said fore-and-aft extending member, one of said ram-connecting means including a relatively fixed part and a part pivoted to the relatively fixed part, means for connecting the associated end of said ram to said pivoted part, and a releasable lock for holding said pivoted part against movement with respect to said relatively fixed part, and means adapted to act between said implement part and said frame means for holding said implement part against movement in said one direction relative to said frame means.

17. A ram mounting for an implement of the type that is adapted to be connected with a tractor having a double-acting hydraulic ram for operating a part on the implement, said ram mounting comprising an arm, means for swingably connecting said arm adjacent one end with the implement, means for detachably connecting one end of said ram with the other end of said arm, stop means adapted to be engaged by said arm for limiting movement of the latter in one direction, means for mounting said stop means on the implement, releasable means operative when said arm is disposed against said stop means for locking the arm against said stop means so as to restrain movement of the arm away from the stop means, a ram carrier, means for shiftably mounting the ram carrier on the implement, means for connecting said ram carrier with said implement part for operating the latter movement of the ram carrier, means on the latter for releasably connecting the other end of said ram thereto, a part movable with the ram carrier and said implement part into a given position relative to the implement by complete operation of the ram in one direction, locking means engageable with the part which moves with the ram carrier for holding said last mentioned part in said given position, and means for connecting said locking means with the implement, said locking means, when holding said ram carrier part in said given position, accommodating a release of said releasable means and a movement of said swingable arm away from said stop means, whereby the release of said ram from said swingable arm and said carrier is facilitated.

18. A ram mounting for an implement of the type that is adapted to be connected with a tractor having a double-acting hydraulic ram for operating a part on the implement, said ram mounting comprising an arm, attaching means for swingably connecting said arm adjacent one end thereof with the implement, means for detachably connecting one end of said ram with the other end of said arm, stop means engageable by said arm for limiting movement thereof in one direction relative to said attaching means, said attaching means and said arm having openings adapted to come into registry when said swingable arm is forced against stop means by said ram, means for connecting said stop means with the implement, a ram carrier adapted to be connected with said implement part, means for shiftably mounting said ram carrier on said implement, means on said ram carrier for releasably connecting the other end of said ram thereto, a part movable with said ram carrier and said implement part into a given position relative to the implement by complete operation of said ram in one direction, an abutment, means for mounting said abutment on the implement, the part that is movable with said ram carrier having an opening therein that is adapted to be brought into registry with said abutment when said ram carrier part is moved into said given position, and a locking pin insertable in the opening in said ram carrier part and into a position substantially against said abutment for holding said ram carrier part in said given position.

OREY W. OERMAN.

References Cited in the file of this patent

UNITED STATES PATENTS

| Number | Name | Date |
|---|---|---|
| 353,497 | Packer | Nov. 30, 1886 |
| 1,928,952 | Silver | Oct. 3, 1933 |
| 2,185,179 | Bird et al. | Jan. 2, 1940 |
| 2,314,041 | Gurries | Mar. 6, 1943 |
| 2,318,205 | Drennan | May 4, 1943 |
| 2,369,437 | Court | Feb. 13, 1945 |
| 2,392,006 | Silver | Jan. 1, 1946 |
| 2,412,754 | Silver | Dec. 17, 1946 |

FOREIGN PATENTS

| Number | Country | Date |
|---|---|---|
| 108,038 | Australia | July 19, 1939 |